A. TEAS.
HARNESS-SADDLE.
No. 170,916. Patented Dec. 7, 1875.
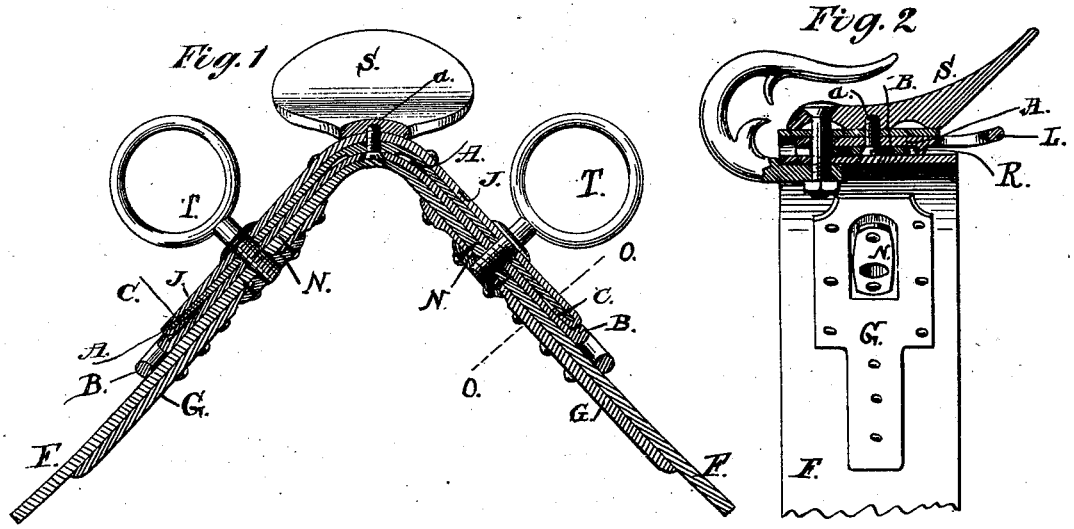
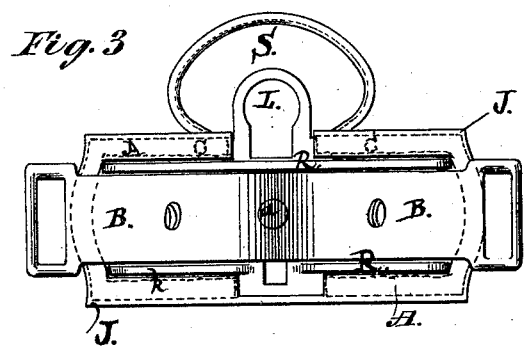
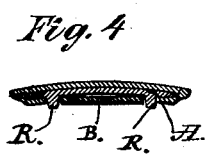

UNITED STATES PATENT OFFICE.

ANDREW TEAS, OF NEWARK, NEW JERSEY.

IMPROVEMENT IN HARNESS-SADDLES.

Specification forming part of Letters Patent No. 170,916, dated December 7, 1875; application filed September 25, 1875.

*To all whom it may concern:*

Be it known that I, ANDREW TEAS, of the city of Newark, in Essex county, in the State of New Jersey, have invented certain new and useful Improvements in Harness-Saddles; and I do hereby declare that the following is a full, clear, and exact description thereof, reference being had to the annexed drawing, forming a part of this specification.

In the drawings, Figure 1 is a longitudinal vertical section of my improved saddle-tree, finished as a saddle, with the exception of having no padding or under finish. Fig. 2 is a cross vertical section of the same. Fig. 3 is a plan view of the under side of the tree, showing the metallic backband, held in place by the ribs of the tree. Fig. 4 is a cross-section in line o o, showing the manner in which the jockey is slipped upon and secured to the tree.

The chief features of my invention consist in making my improved tree with straight plane sides, slightly arched laterally, as shown in Fig. 4, and provided with parallel guiding and strengthening ribs, so that the tree can be slipped into the two halves of the jockey. Also, in providing the under side of each half of the jockey with a pocket or border of leather, stitched to the edges and bottom of the jockey, into which the side pieces of the tree are slipped, thus securing the jockey to the tree.

A represents the frame or tree, which I prefer to form of a single piece of cast malleable iron. The crown is a half-round arch, slightly flattened for the seat S, and the sides are nearly straight, and are slightly curved laterally, as shown in Fig. 4. The under side of the tree is provided with two parallel ribs, R, about one-eighth of an inch, or more, square, extending nearly the whole length of the tree, and about half an inch from the outer edges of the tree. These two ribs add very materially to the strength and rigidity of the tree without much increase of weight, and, at the same time, serve as guides to the backband. The outer edges of the tree may be made quite thin, to decrease weight, and to fit more easily and closely into the jockey. In the cheaper grade of saddles the upper surface of the tree may be japanned or otherwise finished, and the jockey be omitted. L is the crupper-loop. B is the metallic backband. This may be formed of a single piece of sheet metal, provided with a loop at each end for the backband-strap. This band B is formed to correspond and fit to the under side of the tree, and to lie snugly between the ribs R, and should be long enough to have its loops just below the ends of the tree. A screw, *a*, passes through the center of band B, securing it to the under side of the tree. The same screw passes through the jockey and into the seat. J is the jockey. In making the jockey for this tree I use two half-jockeys, which, when in place, constitute one whole jockey, having the joint under the seat. Each half-jockey may be made of a piece of thick leather, cut to the desired size and shape, as shown in Figs. 1 and 3. To the under side of each half-jockey, at its outer edges and lower end, are stitched narrow strips C of thin leather, as shown by dotted lines in Fig. 3. These strips, together with the upper thick leather piece of the half-jockey, form a pocket, adapted to receive one of the side pieces of the tree. These are to be slipped, end first, into the pockets, until the whole upper surface of the tree (except under the seat) is snugly covered by the two half-jockeys. F is the ordinary flap. G is a metal stiffener, provided with tack-holes for tacking it to the flap. Near its upper end is a cavity, adapted to receive and lock the terret-nut N. The socket part of the terret-nut passes through the stiffener, and into or through the flap. T is the terret, which passes through the jockey J, the tree A, the backband B, the flap F, the stiffener G, and the nut N, thus confining and securing all of said parts together. H is the ordinary water-hook.

The padding is not shown in the drawing, but may be applied as is customary.

The obvious advantages of my improvements consist in the strength, lightness, cheapness, and simplicity of construction.

What I claim as new is—

1. The tree A, transversely arched, with ribs R, substantially as and for the purposes set forth.

2. The continuous metal backband B in one piece, in combination with a harness-saddle, substantially as and for the purposes set forth.

3. The jockey J, provided with strips C, substantially as described, for the purpose of forming pockets for the tree to slip in.

In testimony that I claim the above invention I have hereunto set my hand this 21st day of September, 1875.

ANDREW TEAS.

Witnesses:
  A. J. DE LACY,
  WM. P. TEACHMAN.